Patented Aug. 21, 1951

2,565,209

UNITED STATES PATENT OFFICE 2,565,209

SODIUM CHLORITE MANUFACTURE

Francis H. Dole, Kenmore, N. Y., assignor to Mathieson Chemical Corporation, a corporation of Virginia No Drawing. Application May 25, 1950,
Serial No. 164,288

6 Claims. (Cl. 23—86)

This invention relates to improvements in the manufacture of water-soluble chlorites and particularly to a process of purifying aqueous solutions of such chlorites during manufacture from chlorine dioxide by the carbon reduction method to obtain a product of improved color and stability and of reduced metal content.

In the manufacture of sodium chlorite, commercially the most important chlorite, chlorine dioxide is usually generated by any of several methods. This gas, diluted with air or other inert diluent, is in one method absorbed in an aqueous slurry of finely divided carbon and lime carrying sodium hydroxide in solution. The carbon serves as reducing agent for the chlorine dioxide and is itself oxidized to $CO_2$:

$$4ClO_2 + C + 4NaOH \rightarrow 4NaClO_2 + CO_2 + H_2O$$

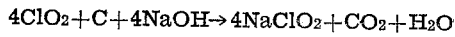

The lime present removes the $CO_2$ as carbonate:

$$Ca(OH)_2 + CO_2 \rightarrow CaCO_3 + H_2O$$

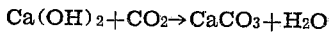

in order that all the sodium added to the system as caustic soda may appear in the final product as $NaClO_2$. Calcium carbonate, excess lime and carbon are removed by filtration and the filtrate is evaporated to dryness to obtain the product.

While carbon appears to be the cheapest reducing agent per unit of reducing power and generally is commercially most satisfactory for this purpose, it has the disadvantage that it is to a considerable extent only partially oxidized and the intermediate oxidation products remain dissolved in the alkaline solution. On evaporation of the solution and drying of the solid sodium chlorite, the product usually has a yellow color which is disadvantageous, particularly from a sales viewpoint. Furthermore, the organic impurities form with the sodium chlorite a combustible mixture which occasionally inflames under the conditions of the drying process. This not only represents an economic loss of sodium chlorite but results in products containing lower percentages of active ingredient and higher proportions of chlorates, chlorides and other contaminants. In addition, such conflagrations endanger life and property.

The stability can be improved by including a few per cent of caustic or soda ash in the product but this adds to the cost and represents an additional impurity. While the use of non-carbonaceous reducing agents avoids the above-described difficulties, none can compete economically with carbon for this purpose. Various unsuccessful expedients have been tried by others familiar with this manufacturing process to purify the sodium chlorite including the use of chlorine and extraction with non-aqueous solvents such as carbon tetrachloride, chloroform or tertiary butyl alcohol. Chlorination results in some improvement in color of the finished product and may chlorinate the organic impurities, but it does not appear to remove them. The occurrence and severity of decomposition on the drying rolls is not decreased by the treatment of the sodium chlorite liquor with chlorine.

I have discovered that the sodium chlorite can be completely purified with respect to the soluble organic impurities by the addition of a soluble alkaline earth metal compound to the aqueous chlorite in amount sufficient to precipitate the impurities. Barium salts whose anions are inert to sodium chlorite are useful, for example, the chloride, nitrate, oxide, hydroxide and the like. I have found that the corresponding calcium compounds may be used to effect appreciable purification of the sodium chlorite liquors but are more likely to precipitate the impurities incompletely and to leave soluble calcium compounds in the liquor. I have found, however, that the corresponding strontium compounds appear to be as effective as the barium compounds in my purification process although they cannot be considered economical at present for commercial use.

The selected reagent is normally added to the slurry resulting from the absorption of $ClO_2$ in the aqueous mixture of caustic, lime and carbon but, if desired, it may be added to the filtrate from this slurry. I have found to my surprise that the additional precipitate formed on the introduction of the barium compound, far from increasing filtration difficulties, has a salutory effect on the solids previously present in the slurry and facilitates the subsequent filtration. The filtration time of the treated slurry may be less than half that of the untreated slurry. Another unexpected result of my purification treatment is the reduction of the $R_2O_3$ (iron and aluminum oxide) content of the sodium chlorite. Untreated chlorite may contain 0.1 per cent whereas the treated product usually contains less than 0.01 per cent. The reagent usually is added in the form of an aqueous solution conveniently a saturated solution, although a slurry of a less soluble reagent, for example $Ba(OH)_2 \cdot 8H_2O$ may be used. Indeed, crystals of the reagent can be added to the slurry with satisfactory results.

Because of the unknown and variable nature of the soluble organic impurities no definite proportion of reagent based on the sodium chlorite content of the liquor can be specified for each instance. I have found that the appropriate amount of reagent to add can be determined for each batch very simply by measuring the volume of solution of reagent required to precipitate completely the impurities in a sample of the liquor of known volume. For example, to 10 ml. of the slurry I add dropwise a 10 per cent barium chloride solution until additional reagent produces no additional precipitate. From the thus measured volume of reagent I calculate the volume of 10 per cent barium chloride solution to add per 1000 gallons of slurry to result in complete precipitation. The titration also may be carried out using a saturated barium chloride solution.

Thus by means of titration it is possible to add just sufficient reagent so that complete purification is obtained, avoiding at the same time an excess of the reagent to subsequently contaminate the product. In some instances it may happen inadvertently or by accident that an excess of reagent is present. Such excess may be easily removed by the addition of appropriate amounts of soda ash to the mixture before filtering to remove the excess reagent as the insoluble carbonate. Treatment of the slurry with soda ash previously has been known to reduce the calcium content of the slurry and thus the resulting sodium chlorite product so that it is advantageously combined with my treatment to yield a product low in calcium. A solid sodium chlorite product which has not been treated except to filter the slurry from the absorber and evaporate may contain as much as about 0.2 per cent $CaCO_3$. When treated by my process in conjunction with a subsequent soda ash treatment the product usually contains only about 0.02 per cent $CaCO_3$.

Economic considerations may dictate the use of somewhat less reagent than the amount required to purify the chlorite completely but such a limited treatment is to be considered within the scope of my invention when it is sufficient to produce my improved results to a degree permissible within economic limits.

My invention will be further described by means of the following illustrative examples. In the examples, the ignition point of various samples of sodium chlorite was measured on materials dried in a vacuum oven overnight. Consistent results could not be obtained on drying at 110° C. at atmospheric pressure but a water aspirator vacuum of about 25 mm. was sufficient. A clean test tube was filled to a depth of 1.5 inches and immersed in a Woods metal bath heated at a rate of approximately 2° C. per minute until ignition occurred. Light transmission was measured by dissolving the chlorite in water in the proportion of two pounds per gallon and comparing the transmission of 5200 A. U. light through this solution and through water in a photoelectric colorimeter.

Example I

To five gallons of a filtered batch of reducer liquor was added an aqueous barium chloride solution in amount just sufficient to effect complete precipitation of the organic impurities. After filtering, the solution was concentrated under vacuum and charged to internally steam-heated drying rolls. The drying was accomplished without incident and a white solid sodium chlorite was obtained which had a light transmission of 86 per cent compared with a value of about 50 per cent for the untreated product. Barium was absent in the product which showed an ignition temperature of 165° C.

Example II

Four hundred pounds of barium chloride crystals was added to 3120 gallons of absorber slurry. The rate of filtration of this batch was about 2.4 times that of typical untreated batches. After filtration, the purified liquor was charged through the evaporator and dryer liquor storage tanks to steam-heated drying rolls. In spite of contamination of the purified solution by residual unpurified liquors in the equipment used, the product had a light transmission of 74 per cent, a considerable improvement over the 50 per cent value obtained without purification. Although the liquor feed to the drying rolls stopped several times during this experimental operation, an event normally favoring overheating of the solid and consequent violent decomposition, no fires were experienced. This product had an ignition point of 157° C.

Example III

Another batch of sodium chlorite treated substantially as described in Example II except that in addition a small amount of soda ash was added to the slurry after the barium chloride treatment and before filtration. A sodium chlorite product was obtained on filtration and drying containing only 0.004 per cent $R_2O_3$ and 0.027 per cent calcium carbonate. The ignition point was 164° C. and the light transmission was 86 per cent.

Example IV

When barium hydroxide was used as reagent in place of barium chloride, equally good results were obtained.

Example V

Barium nitrate treatment gave a sodium chlorite product of substantially the same quality with respect to ignition point, $R_2O_3$ content and filtration rate of the slurry.

Example VI

Strontium chloride was found to be as effective as barium chloride in the purification treatment except for higher cost.

Example VII

Strontium hydroxide was tried and appeared to be equivalent to barium chloride for this treatment except in cost.

Thus my invention provides for product purification with respect to color, stability and metal content of sodium chlorite by simple addition of a barium or strontium reagent to the aqueous chlorite in the regular course of manufacture. My invention has been particularly described with reference to sodium chlorite, but it is equally appropriate to apply it to other water-soluble chlorites including especially potassium chlorite and calcium chlorite. In the latter case, of course, the use of soda ash to remove excess reagent is avoided.

I claim:

1. In the manufacture of water-soluble chlorites by the carbon reduction method, the improvement which comprises adding an alkaline earth metal reagent selected from the group consisting of water-soluble barium and strontium compounds to the chlorite in aqueous medium and separating precipitated impurities.

2. In the manufacture of water-soluble chlorites by the carbon reduction method, the improvement which comprises adding a water-soluble barium compound to the chlorite in aqueous medium and separating precipitated impurities.

3. In the manufacture of sodium chlorite by the carbon reduction method, the improvement which comprises adding an alkaline earth metal reagent selected from the group consisting of water-soluble barium and strontium compounds to the chlorite in aqueous medium and separating precipitated impurities.

4. In the manufacture of sodium chlorite by the carbon reduction method, the improvement which comprises adding a water-soluble barium compound to the chlorite in aqueous medium and separating precipitated impurities.

5. In the manufacture of sodium chlorite by the carbon reduction method, the improvement which comprises adding an excess of an alkaline earth metal reagent selected from the group consisting of water-soluble barium and strontium compounds to precipitate dissolved impurities from aqueous medium, subsequently adding soda ash to precipitate the excess alkaline earth metal first added, and separating precipitated impurities.

6. In the manufacture of water-soluble chlorites by the carbon reduction method, the improvement which comprises adding an alkaline earth metal reagent selected from the class consisting of water-soluble barium and strontium compounds to the slurry of carbon and aqueous chlorite solution before filtration.

FRANCIS H. DOLE.

REFERENCES CITED

The following references are of record in the file of this patent:

UNITED STATES PATENTS

| Number | Name | Date |
|---|---|---|
| 2,078,045 | Vincent | Apr. 20, 1937 |
| 2,092,945 | Vincent | Sept. 14, 1937 |
| 2,489,573 | Hampel | Nov. 29, 1949 |
| 2,489,575 | Hampel | Nov. 29, 1949 |

Certificate of Correction

Patent No. 2,565,209                                                    August 21, 1951

FRANCIS H. DOLE

It is hereby certified that error appears in the printed specification of the above numbered patent requiring correction as follows:

Column 4, line 75, for "chloride" read *chlorite*;

and that the said Letters Patent should be read as corrected above, so that the same may conform to the record of the case in the Patent Office.

Signed and sealed this 16th day of October, A. D. 1951.

[SEAL]

THOMAS F. MURPHY,
*Assistant Commissioner of Patents.*